(12) United States Patent
Rajagopalan (10) Patent No.: US 11,934,545 B2
(45) Date of Patent: Mar. 19, 2024

(54) SECURE WAY TO AUTHENTICATE FROM FILE PROTOCOL WHILE HANDLING THIRD PARTY COOKIES AND BROWSER INCONSISTENCIES

(71) Applicant: FORTRA, LLC, Eden Prairie, MN (US)

(72) Inventor: Anirudhan Rajagopalan, Union City, CA (US)

(73) Assignee: FORTRA, LLC, Eden Prairie, MN (US)

( * ) Notice: Subject to any disclaimer, the term of this patent is extended or adjusted under 35 U.S.C. 154(b) by 302 days.

(21) Appl. No.: 17/353,821

(22) Filed: Jun. 22, 2021

(65) Prior Publication Data
US 2022/0405410 A1 Dec. 22, 2022

(51) Int. Cl.
| | |
|---|---|
| G06F 21/62 | (2013.01) |
| G06F 21/31 | (2013.01) |
| G06F 21/45 | (2013.01) |
| H04L 9/40 | (2022.01) |
| H04L 67/02 | (2022.01) |
| H04L 67/146 | (2022.01) |

(52) U.S. Cl.
CPC .......... *G06F 21/6209* (2013.01); *G06F 21/31* (2013.01); *G06F 21/45* (2013.01); *H04L 63/083* (2013.01); *H04L 63/102* (2013.01); *H04L 67/02* (2013.01); *H04L 67/146* (2013.01)

(58) Field of Classification Search
CPC ...... G06F 21/6209; G06F 21/31; G06F 21/45; H04L 63/083; H04L 63/102; H04L 67/02; H04L 67/146
See application file for complete search history.

(56) References Cited

U.S. PATENT DOCUMENTS

| | | | |
|---|---|---|---|
| 9,319,469 B2 | 4/2016 | Ruhlen et al. | |
| 10,079,905 B2* | 9/2018 | Toussaint | H04L 67/01 |
| 10,545,884 B1* | 1/2020 | Linga | H04W 12/08 |
| 10,607,020 B2* | 3/2020 | Linga | G06F 21/62 |
| 11,010,483 B1* | 5/2021 | Linga | G06F 21/62 |
| 11,128,624 B2* | 9/2021 | Wijaya | H04L 63/0884 |
| 11,153,284 B2* | 10/2021 | Chauhan | H04L 63/20 |
| 11,233,832 B2* | 1/2022 | Chauhan | G06F 3/0483 |
| 2018/0218006 A1 | 8/2018 | Palmer et al. | |
| 2018/0232394 A1 | 8/2018 | Danziger et al. | |

OTHER PUBLICATIONS

Extended European Search Report for European Application No. EP 22180205.1, dated Nov. 7, 2022, 10 pgs.

* cited by examiner

*Primary Examiner* — Hosuk Song
(74) *Attorney, Agent, or Firm* — Fredrikson & Byron, P.A.

(57) ABSTRACT

A system and method for authenticating a user from file protocol for viewing secure data in a browser is provided. The authentication method requires a server dedicated to validate authToken for monitoring document access requests and enforcing rules and policies to limit access to others having invalid authToken. Further, the method for authenticating a user for viewing a secured file in a browser, comprising using cross origin security policies; using history trick functions for redirecting the user back to the file; using signed tokens for making authentication context tampering resistant; using combination of AUTH session token and secret to support multiple AUTH sessions; and using multiple use cases where multiple files can be opened simultaneously with different authorization requirements.

16 Claims, 8 Drawing Sheets

SECURE WAY TO AUTHENTICATE FROM FILE PROTOCOL WHILE HANDLING THIRD PARTY COOKIES AND BROWSER INCONSISTENCIES

FIELD OF THE INVENTION

The present invention relates to a system and method for providing secure access to documents shared over a network, and more specifically to authenticate a user for viewing the secured file using file protocol while handling third party cookies and browser inconsistencies.

BACKGROUND

With the use of Internet for sharing documents, Enterprise networks contain valuable information that forms an increasingly attractive target for malicious actors. Parties may desire to share documents having sensitive information over the Internet. For instance, a user may share credit reports, driver licenses, social security numbers, university certificates, and similar confidential information with a second party as part of a job application, a mortgage application, a credit inquiry, a credit account (e.g., to establish a credit card), and in similar situations where confidential information may be needed to authenticate an individual.

The protection of sensitive data has become an important issue to users of computers. Sensitive data, such as corporate records, credit card numbers, personal data, or other sensitive information may be misappropriated if a computer is stolen, or if an unauthorized individual gains access to computer network and copies information from some or all of its files or by monitoring and recording the network packets that are transmitted unprotected.

In some ways attackers are considered to have the upper hand due to the fact that the attackers only need to exploit one specific vulnerability whereas security software needs to protect against a myriad combination of attacks. Often attackers exploit the weakest link. Cross-site scripting (XSS) or related attacks, Cross-site request forgery (CSRF) or related attacks, Session and/or transaction hijacking related attacks, JavaScript used to send a Hypertext Transfer Protocol (HTTP) cookie to an unintended destination or website. This information may then be used for nefarious purposes such as impersonating the user.

Cookies are usually text files having small data like a username, email, contact info and password. Cookies and browser inconsistencies are used to perform essential functions in the modern web. They are used to identify the device and user using the computer network. However, for opening/viewing the secure file in a browser involves multiple tabs having stored data like cookies and browser inconsistencies. Hence, ensuring security when utilizing data is very difficult and inefficient, having a potential for the phishing attacks.

In another approach for opening/viewing the secure file in a browser, a user had to first type the credentials which is very simple and user friendly. But this method has some disadvantages like the credential used is not rolling type so, having a potential for the replay attacks. Alternatively, opening/viewing the secure file in a browser using above method is not automatic and hence time/resource consuming.

In view of aforementioned problems, the present invention provides a method for proving authentication to a user for viewing the secured file using file protocol while handling third party cookies and browser inconsistencies. This invention uses a combination of browser technologies, cross origin security policies, and history trick to make sure the flow works seamlessly across various browsers. This invention provides a design/implementation for securely authenticating the user while maintaining the simplest possible user experience.

SUMMARY

In the first aspect, the present invention provides a method for authenticating a user for viewing a secured file in a browser. The method comprising: selecting a secured file in a server to access via a browser on a user device; reading a file wrapper which appears in a user interface associated with the user device as the original file type and which comprises the metadata and the data as the different file type; generating an inline frame in the browser informing the server to create an authorization session; generating an authorization session by the server with the browser on the user device; storing the authorization session data and history path in the browser; verifying user data access rights associated with the user device using an authorization key; opening the secured file in the browser on the successful validation of authorization key using stored history path in the browser. The history path uses history trick functions for redirecting the user back to the file after successful authentication. The method further comprising validating user using combination of authorization session tokens and secret from server to support multiple sessions. The method further comprising: using multiple use cases where multiple files can be opened simultaneously with different authorization requirements. The method uses history path to redirect the user back to insecure browsing context once the user authenticates in the secure browsing context. The history path is used to help in handling authentication schemes such as Security Assertion Markup Language or work flows where the user can reset password using the created history length. The method provides protection from tampering of secured file by using a signed token to ensure protection against document tampering by storing the said signed token of the reason for which an authentication request was initiated. The method tackles multiple browser inconsistencies by passing the authorization session token in URL of the inline frame that makes the inline frame unique and non cacheable.

In the another aspect, the present invention provides a method comprising transferring sensitive information from a fully secure HTTPs browsing context to a secure context embedded inside an insecure file browsing context. The method utilizes history trick function to redirect the user back to insecure browsing context once the user authenticates in the secure browsing context. The history trick function is used to help in handling authentication schemes such as Security Assertion Mark-up Language (SAML) or work flows where the user can reset password using the created history length.

In the another aspect, the present invention provides a method for providing protection from tampering by using a signed token to ensure protection against document tampering by storing the said signed token of the reason for which an authentication request was initiated. The method providing authentication to applications running on the local machine such as Windows app or a Mac-OS desktop app. The method ensuring no sensitive data is leaked to the unsecure context or any malicious scripts running in unsecure context. The method is used for tackling multiple browser inconsistencies by passing the AUTH session token in the URL of the IFRAME that makes the IFRAME unique and non CACHABLE. The method can also be applied on all modern browsers that support the latest HTML5 standards and supports on all browser inconsistencies. The browser inconsistencies are not limited to only BFCACHE busting, IE protected zones, and Safari Intelligent Tracking Protection.

In another aspect, the present invention provides a system for authenticating a user for viewing a secured file in a browser, the system comprising: a processor configured to: select a secured file in a server to access via a browser on a user device; read a file wrapper which appears in a user interface associated with the user device as the original file type and which comprises the metadata and the data as the different file type; generate an inline frame in the browser informing the server to create an authorization session; generate an authorization session by the server with the browser on the user device; a memory to store the authorization session data and history path in the browser; wherein the processor is configured to verify user data access rights associated with the user device using an authorization key and to open the secured file in the browser on the successful validation of authorization key using stored history path in the browser. The history path uses history trick functions for redirecting the user back to the file after successful authentication. The system further validates a user using combination of authorization session tokens and secret from server to support multiple sessions. The system uses multiple use cases where multiple files can be opened simultaneously with different authorization requirements. The system uses history path to redirect the user back to insecure browsing context once the user authenticates in the secure browsing context. The history path is used to help in handling authentication schemes such as Security Assertion Markup Language or work flows where the user can reset password using the created history length. The system provides protection from tampering of secured file by using a signed token to ensure protection against document tampering by storing the said signed token of the reason for which an authentication request was initiated. The system tackles multiple browser inconsistencies by passing the authorization session token in URL of the inline frame that makes the inline frame unique and non cacheable.

Further areas of applicability will become apparent from the description provided herein.

BRIEF DESCRIPTION OF DRAWINGS

Some embodiments of the present invention are illustrated as an example and are not limited by the figures of the accompanying drawings, in which like references may indicate similar elements and in which.

DETAILED DESCRIPTION

While the above description constitutes the preferred embodiment of the present invention, it will be appreciated that the invention is susceptible to modification, variation and change without departing from the proper scope and fair meaning of the accompanying claims.

In the following detailed description of embodiments of the invention, numerous specific details are set forth in order to provide a thorough understanding of the embodiment of invention. However, it will be obvious to a person skilled in art that the embodiments of invention may be practiced with or without these specific details. In other instances well known methods, procedures and components have not been described in detail, so as not to unnecessarily obscure aspects of the embodiments of the invention.

The terminology used herein is for the purpose of describing particular embodiments only and is not intended to be limiting of the invention. As used herein, the term "and/or" includes any and all combinations of one or more of the associated listed items. As used herein, the singular forms "a", "an", and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The invention provides a way to securely authenticate a user for opening/viewing a secured file in a browser using file protocol while handling third party cookies and browser inconsistencies. The secured file is a HTML, file that has the document contents embedded as comment blocks after the '</body>' tag. This invention provides a design/implementation for securely authenticating the user while maintaining the simplest possible user experience. Hence, this invention uses a combination of browser technologies, cross origin security policies, and history trick to make sure the flow works seamlessly across various browsers.

The present invention describes a way to provide authentication and authorization from a https:// domain to file:/// domain. The main workflow described here will involve transferring sensitive information from a fully secure browsing context (often referred to https:// domain or https:// context in this document) to a secure context embedded inside an insecure browsing context (file:/// being the insecure browsing context). The method of present invention can also be used to provide authentication to applications running on the local machine, say a Windows app or a Macos desktop app. The method of the invention helps to transfer sensitive information to potentially unsafe context, so it also reduces the burden on the backend as alternatives will involve sending all the information to the backend for sanitization and further usage. The invention is built to work on all modern browsers that support the latest HTML5 standards.

The present invention provides a method to access secured file stored in a server. In order to access a secured file, a remote shell sends a request to the server, informing the server to create an auth session. Server responds with an authSessionID, authSecret. The authSessionId, auth redirection url, and returnPath is then passed to the remote shell. The authSessionSecret doesn't leave the hoisted shell iframe. Local shell destroys all iframe it has created. Local Shell stores the authSessionId & returnPath in history.state using history.replaceState method. Local shell redirects the user to auth redirection url that it got through message channel. Auth module loads up, saves the current history length in sessionStorage and proceeds to auth as usual. If valid auth tokens are not present, it proceeds with auth as usual. After auth, a server call is made to persist the auth and doc_access tokens against this session id. These tokens are fetched from the server using the authSessionSecret back in hoisted shell. The server then redirect back to file:/// protocol by using history.go. The file loads as if it is the first load. The authSessionId in history and authSessionSecret are stored in local Storage. Using these the auth tokens can be fetched and proceed to view in browser. Back in the file://// protocol, Local shell fetches the authSecret from history.state, nulls history.state, and sends the authSecret and any other info stored in history.state to hoisted shell iframe. Hoisted shell iframe uses these values to fetch the actual auth token.

Figure 1:
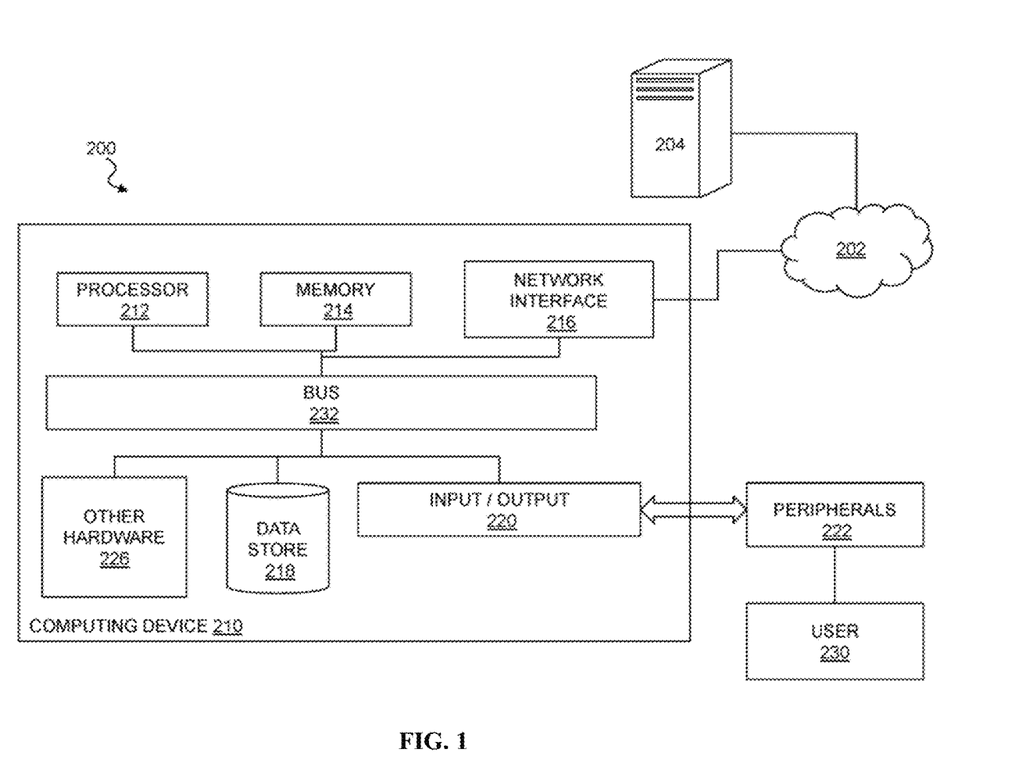
FIG. 1 shows a schematic diagram showing a system authenticating a user for viewing a secured file in a browser in accordance with an embodiment of the present invention.

FIG. 1 shows a system authenticating a user for viewing a secured file in a browser in accordance with an embodiment of the present invention. Referring to the FIG. 1, the system 200 may include a computing device 210 connected to a server 204 through a network 202. For example, the computing device 210 may include a desktop computer, laptop, and smart-phone. Some other devices like personal digital assistant, tablet, wearable computer (e.g., watch, jewelry, or clothing) are also used for this purpose. In certain aspects, the computing device 210 may be implemented using hardware (e.g., in a desktop computer), software (e.g., in a virtual machine or the like), or a combination of software and hardware. The computing device 210 may be a standalone device or a platform distributed across multiple entities.

The network 202 may include public networks such as the Internet, private networks, and telecommunications networks. The network 202 may also include a combination of data networks, and need not be limited to a strictly public or private network. For example, a Public Switched Telephone Network or cellular networks using third generation cellular technology (e.g., 3G or IMT-2000), fourth generation cellular technology (e.g., 4G, LTE. MT-Advanced, E-UTRA, etc.) or WiMax-Advanced (IEEE 802.16m)) and/or along with any switches, routers, hubs, gateways, and the like. This may include Internet, short range communications protocols using, physical connections (e.g., Ethernet), radio frequency communications (e.g., WiFi), optical communications, (e.g., fiber optics, infrared, or the like), ultrasonic communications, or any combination of these.

The server 204 may be any computer or other remote resource that connects to the computing device 210 through the network 202. The server may include threat management resources, gateways or other network devices, remote cloud servers or the like containing content requested by the computing device 210, through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 capable of processing instructions for execution within the computing device 210. The processor 212 may include a single-threaded processor or a multi-threaded processor. The processor 212 may be capable of processing instructions stored in the memory 214 or on the data store 218.

The memory 214 may store information within the computing device 210. The memory 214 may store program instructions, program data, executables, and other software and data useful for controlling operation of the computing device 210 to perform functions for a user. For example, a browser application data is store in the memory 214, to open various sites while using internet.

The memory 214 may include any volatile or non-volatile memory or other computer-readable medium. For example, a Random Access Memory (RAM), flash memory, Read Only Memory (ROM), Programmable Read-only Memory (PROM), Erasable PROM (EPROM), registers, etc. The memory 214 may include a number of different stages and types for different aspects of operation of the computing device 210. For example, a processor may include on-board memory as main memory used as cache for faster access to certain instructions (data), and a separate/external memory to expand memory capacity as desired.

The network interface 216 may include any hardware and/or software for connecting the computing device 210 in a communicating relationship with other resources through the network 202. The network interface 216 used to communicate data between the computing device 210 and other devices. The network interface 216 may, for example, include a router, modem, network card, infrared transceiver, radio frequency (RF) transceiver, near field communications interface, radio-frequency identification (RFID) tag reader, or the like. The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and the like. This may also include an infrared interface, RF interface, and magnetic card reader. However, the network interface 216 (as mentioned above) is used for network communications whereas the input/output interface 220 for local device communications.

A peripheral 222 may include any device used to provide information to or receive information from the computing device 210. This may include input/output (I/O) devices such as a keyboard, mouse or mouse pad, joystick, microphone, a camera, touch screen, scanner, display screen, speaker, printer, projector, headset or any other audiovisual device. Other I/O devices suitable for use as a peripheral 222 include haptic devices, augmented-reality displays, magnetic card readers, digital signal processing device, or the like.

A bus 232 or combination of busses may serve as an electromechanical platform for interconnecting components of the computing device 210 such as the processor 212, memory 214, network interface 216, other hardware 226, data store 218, and input/output interface 220. As shown in the figure, each of the components of the computing device 210 may be interconnected using a system bus 232 or other communication mechanism for communicating information.

Figure 2:
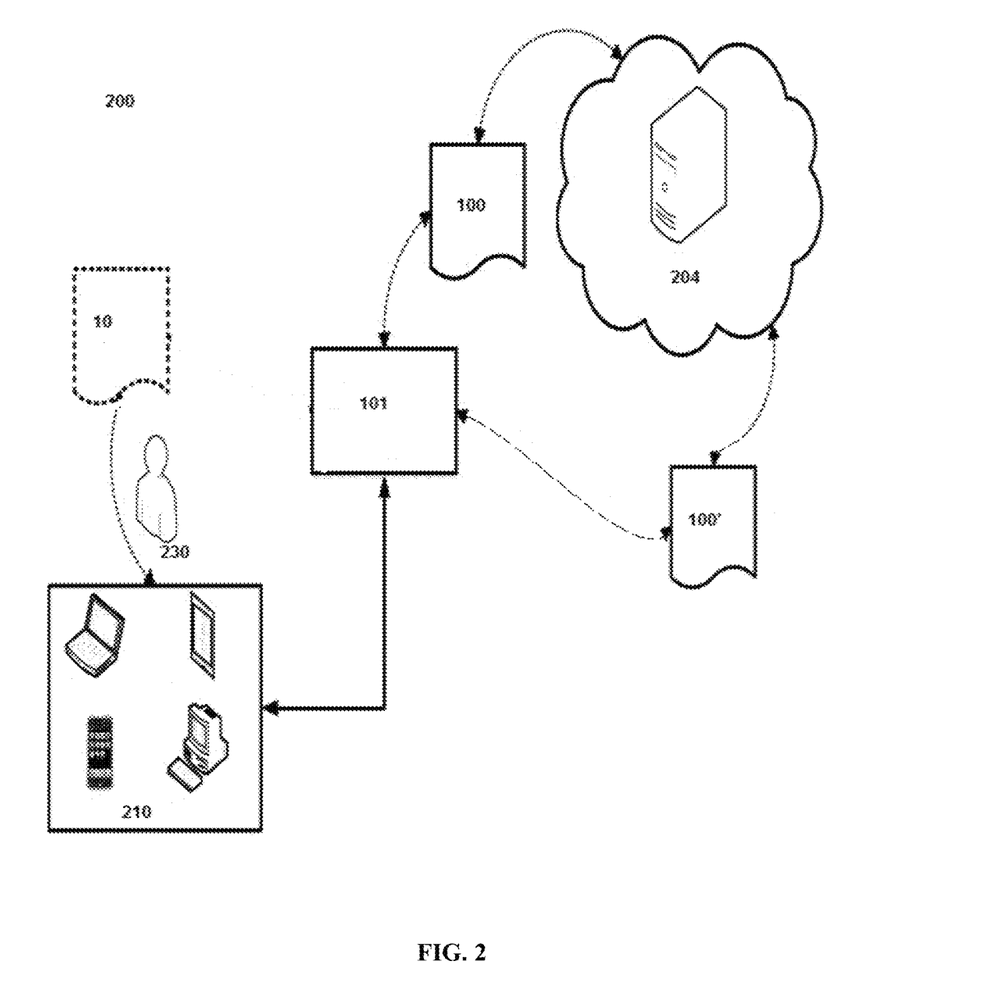
FIG. 2 shows a schematic diagram showing a secured method for authenticating a user for viewing a secured file in a browser in accordance with an embodiment of the present invention.

FIG. 2 shows a schematic diagram showing a secured method for authenticating a user for viewing a secured file in a browser in accordance with an embodiment of the present invention. Referring to FIG. 2, the method comprising of following steps, first a user 230 opens a secured file 10 (file url) in a browser 101. Then the browser 101 reads document metadata and creates iFrame for a secure https context 100. Using authToken, validation of the secure https context 100 is done by a server 204. The secure https context 100 creates an auth session for reason using the server 204. In return server 204 provides authToken and authSecert to the secure https context 100. Persisting the authToken and authSecret as key value for the secure https context 100. Generate a unique authURL using the secure https context 100 and sending the authToken & authURL to the browser 101. Persisting the authToken in a window.history of the browser 101. The the browser 101 deletes the iFrame from the secure https context 100 and redirects the authURL in the respective browser 101. Persisting history state and prompt for login in the respecting browser 101. Now, the user login in the browser 101 and redirected to the login success page of the browser 101. The method use history trick to go to the file url in the browser 101. The browser 101 creates the secure https context 100' with the authToken, and Fetch the authSecret, reason from storage in the secure https context 100'. Then, fetch the authToken using authSecret, reason from the server 204. The method then proceeds with secure action (viewing secured file) using the secure https context 100'.

In other words, the method using a plurality of cross origin security policies, history trick function to redirect the user back to the file, a signed token to make sure that authentication context is not prone to tampering a combination of AUTH session token and secret to support multiple AUTH sessions. Further, the method utilizes a plurality of use cases where multiple files can be opened simultaneously with different authorization requirements.

Figure 3:
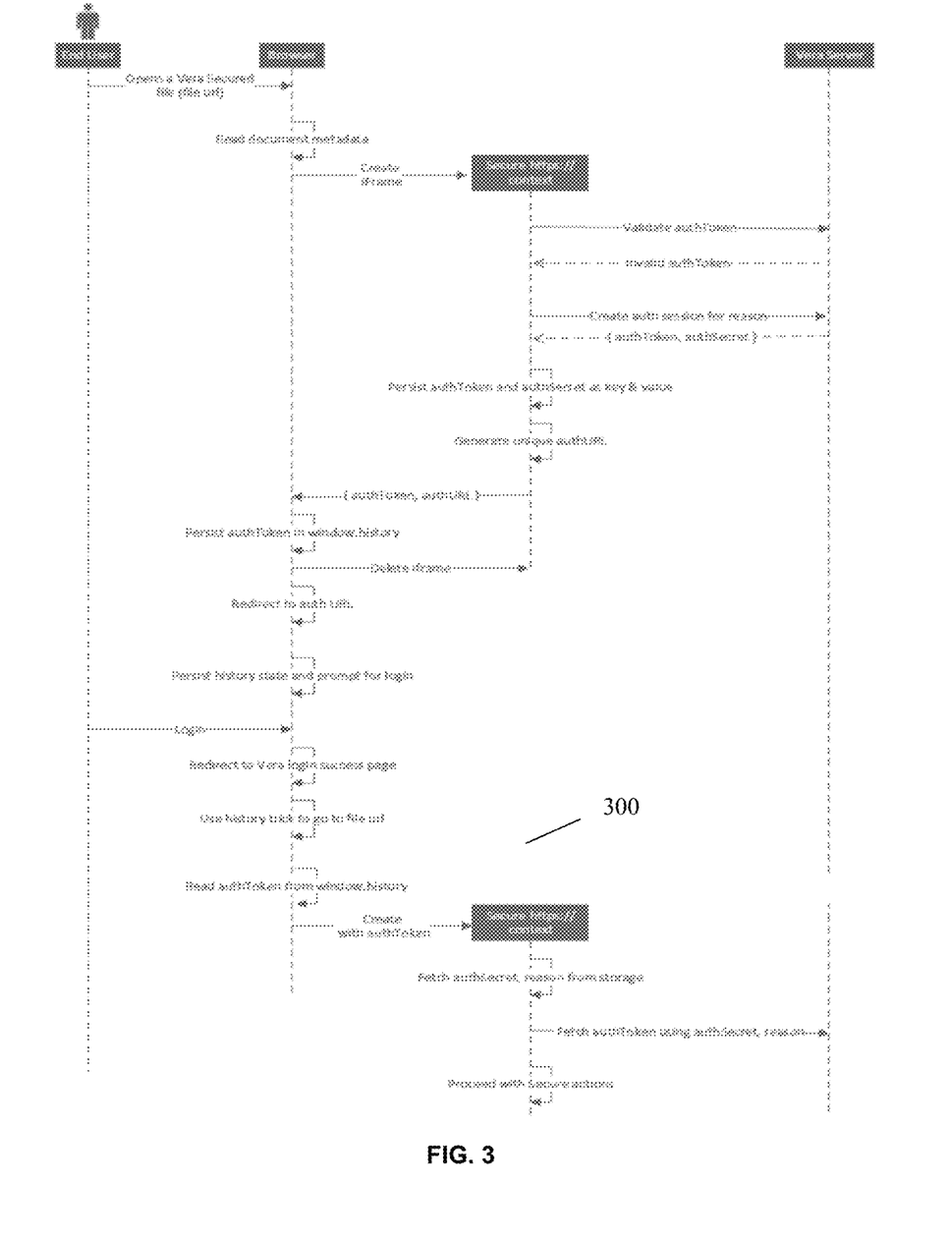
FIG. 3 shows an illustration to illustrate a secured method for viewing a secured file in a browser in accordance with an embodiment of the present invention.

FIG. 3 shows an illustration to illustrate a secured method 300 for viewing a secured file in a browser in accordance with an embodiment of the present invention. FIG. 3 shows a user accessing a secure file stored in a server using a browser on a user device. When a request is initiated to open the secure file, the browser read metadata associated with the file and create an initial frame to access the file stored in the server using https protocol. The browser initiates connection with the server and request for establishing an authorization session. The server responds by establishing authorization session with the browser. Once the authorization session has been established, the data associated with authorization session are stored in the memory and the session is redirected to authorization URL. The initial frame was deleted to persist history information in the browser. The user is then prompted to login to secure webpage and the user validation is screened for authenticity. When the user validation gets success, the user is provided access to the secure file in https context.

Figure 4:
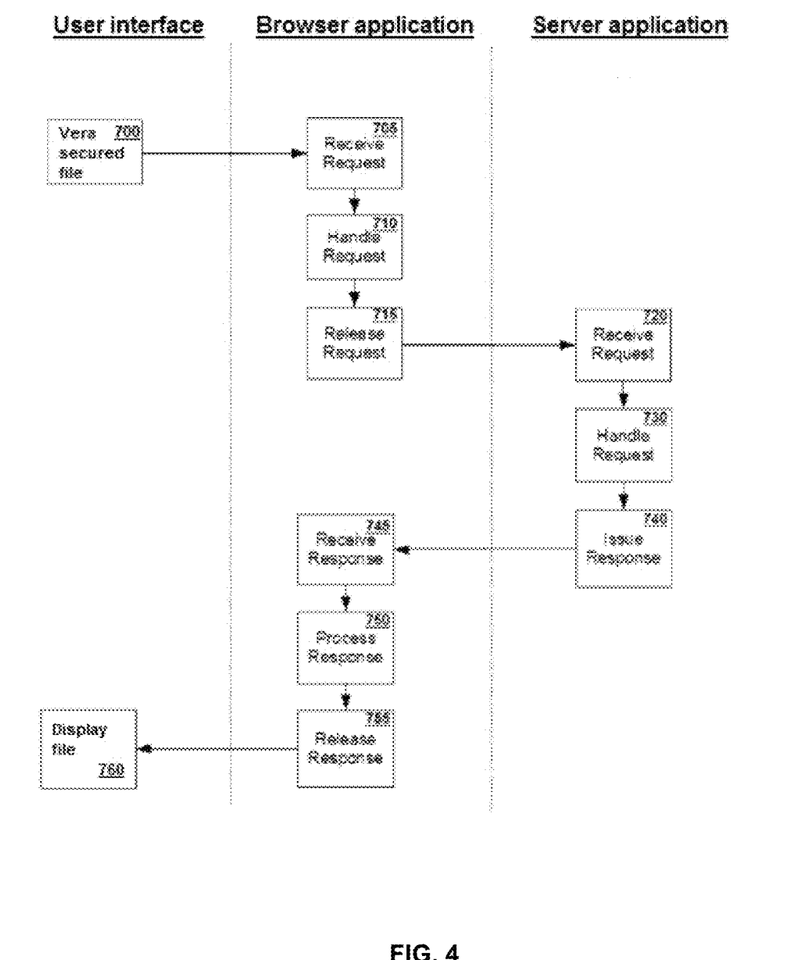
FIG. 4 shows a flow chart showing following steps for authenticating a user and viewing a secured file in a browser in accordance with an embodiment of the present invention.
Figure 5:
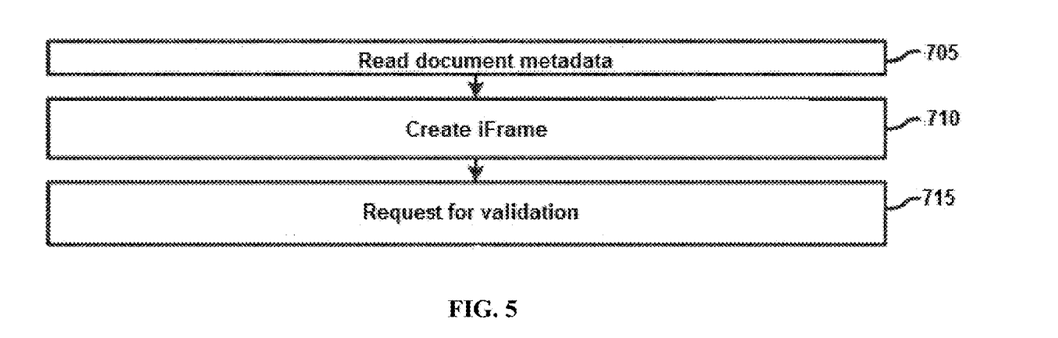
FIG. 5 shows a flow chart showing following steps for processing a user request to open a secured file in a browser in accordance with an embodiment of the present invention.
Figure 6:
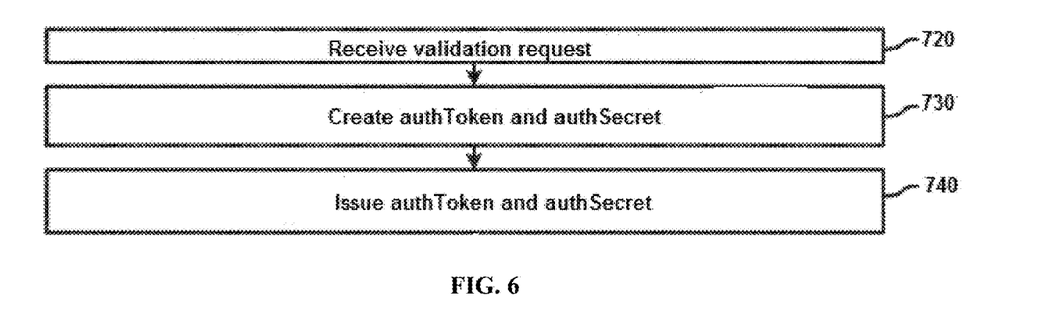
FIG. 6 shows a flow chart showing following steps for authenticating a user from a server in accordance with an embodiment of the present invention.
Figure 7:
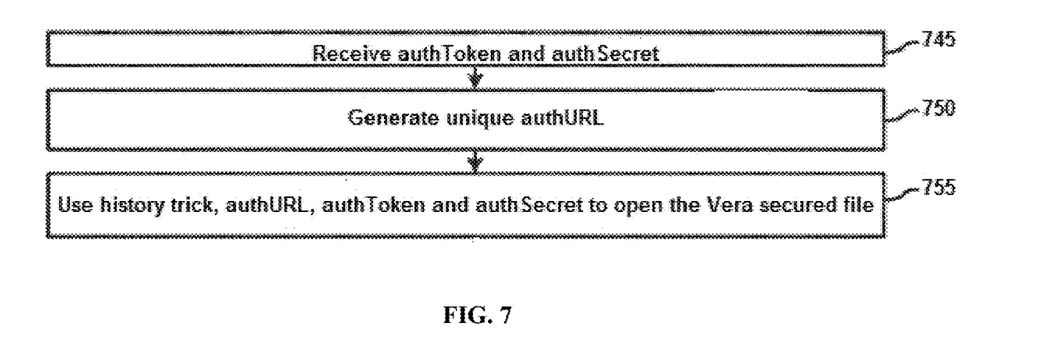
FIG. 7 shows a flow chart showing following steps for processing a valid key received from server to view a secured file in a browser in accordance with an embodiment of the present invention.

FIG. 4 shows a flow chart showing following steps for authenticating a user and viewing a secured file in a browser in accordance with an embodiment of the present invention. The method utilizes three platforms for performing the respective task of authenticate a user and viewing a secured file in a browser. These platforms are user interface, browser application compatible with secure browsing context such as https context and server application. FIGS. 5, 6 and 7 shows different steps of the flow chart as shown in FIG. 4.

Referring to the FIG. 4, a user sends a secured file using a user interface 750 to a browser application. As shown in FIG. 5, the browser application receives the file and read file metadata (receive request) 705. The browser application process the request and create iFrame for a fully secure browsing context such as https:// domain or https:// context (handle request) 710. The browser then sends a request to a server application for authenticate the user (release request) 715.

As shown in FIG. 6, the server application receives the authentication request (receive request) 720. The server application process the request to create authToken and authSecret (handle request) 730. The server then forward the generated valid key/token to the browser application (issue response) 740.

As shown in FIG. 7, the browser application receives the key/token (receive response) 745. The browser application process the key/token to generate unique authURL (process response) 750. The browser application uses history tricks, authURL, authToken and authSession to open the secured file in the browser (release response) 755. Further, the user can view the file on the browser through user interface 760.

Figure 8A:
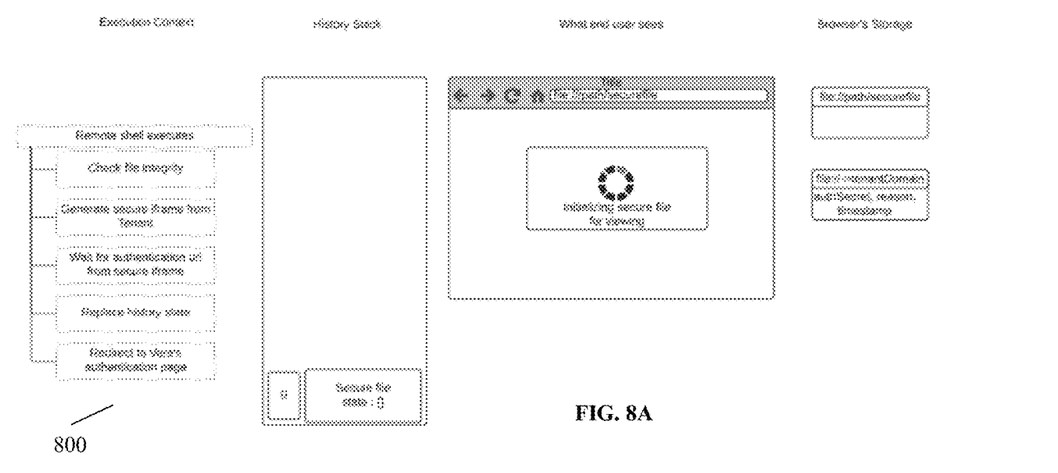
FIGS. 8A and 8B illustrates history trick function in accordance with an embodiment of the present invention.
Figure 8B:
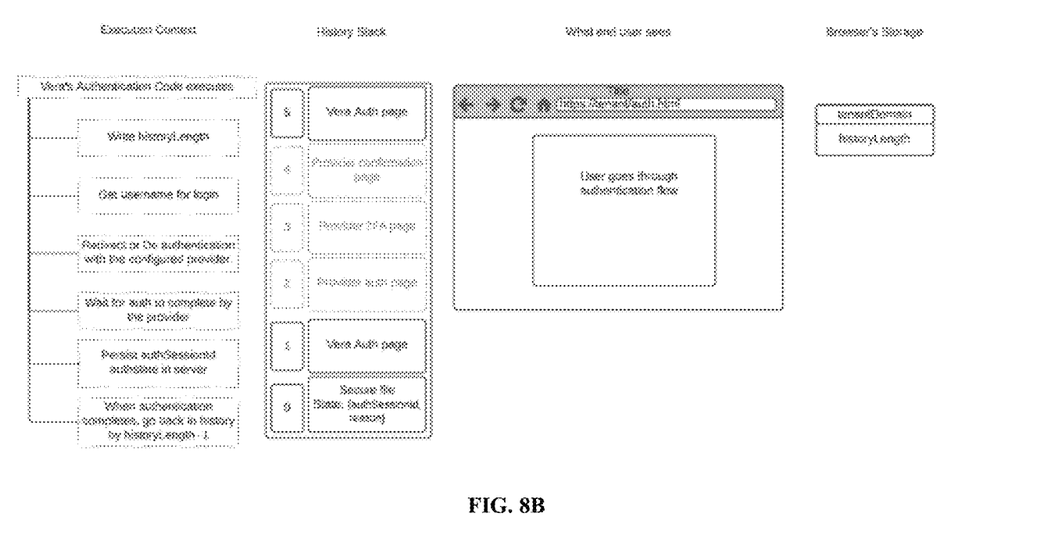

FIGS. 8A and 8B illustrates history trick function 800 in accordance with an embodiment of the present invention. The history trick is used to redirect the user back to file:// context once the user authenticates in the https:// context. FIGS. 8A and 8B shows execution context while the user is requesting to access the secured file. The execution context happens in the background of process. As can be seen from the what end user sees, the user can only see the process happening in the browser.

Figure 9:
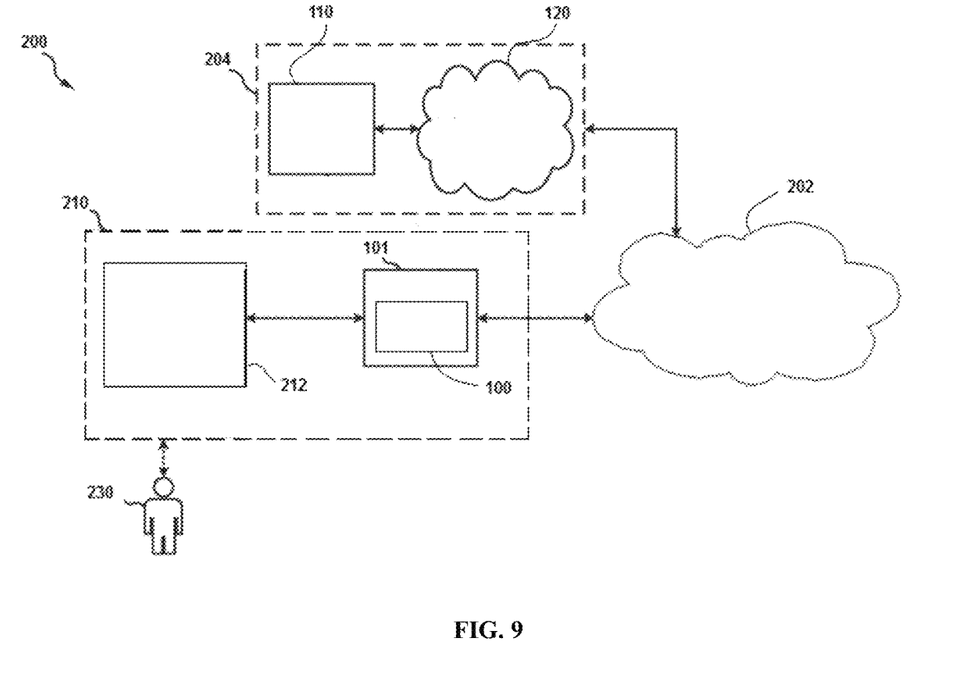
FIG. 9 shows a schematic diagram of a system for authenticating a user to view a secured file in a browser in accordance with an embodiment of the present invention.

FIG. 9 shows a system authenticating a user for viewing a secured file in a browser in accordance with an embodiment of the present invention. Referring to the FIG. 9, the system 200 may include a user 230, computing device 210 connected to a server 204 through a network 202. The computing device 210 comprises a processor 212, having a browser application 101 compatible with secured browser context such as https context 100. The server 204 consists of a decentralized storage unit 120 and authentication unit 110. The authentication unit 110 having a rolling codes generating program (also hardware) to generate unique authToken, authSecret and authURL for the validation and authenticate the user 230. The decentralized storage unit 120 consists of memory space to store the generated unique authToken, authSecret and authURL.

Refer to FIG. 9, a user 230 sends a request to the computing device 210 to opens/view a secured file (file url) in a browser 101. Then the browser 101 reads document metadata and creates iFrame for a secure https context 100. Using authToken, validation of the secure https context 100 is done by a server 204. Then secure https context 100 creates an auth session for reason using the authentication unit 110 of the server 204. In return server 204 provides authToken and authSecert to the secure https context 100. Persisting the authToken and authSecret as key value for the secure https context 100. Generate a unique authURL using the secure https context 100. The system also stores the generated unique authToken, authSecret and authURL in the decentralized storage unit 120 of the server 204. The system forwards the generated authToken & authURL to the browser 101. Persisting the authToken in a window history of the browser 101. Then the browser 101 deletes the iFrame from the secure https context 100 and redirecting the authURL in the respective browser 101. Persisting history state and prompt for login in the respecting browser 101. Now, the user login in the browser 101 and redirecting to the login success page of the browser 101. The system uses history trick to go to the file url in the browser 101. The browser 101 creates the secure https context 100 with the authToken and Fetch the authSecret, reason from storage in the secure https context 100. Then, fetch the authToken using authSecret, reason from the server 204. Now, open and view the secured file using the secure https context 100.

The method includes transferring sensitive information from a fully secure browsing context (such as https:// domain or https:// context) to a secure context embedded inside an insecure browsing context (such as file:///). The history trick function is used to redirect the user back to insecure browsing context once the user authenticates in the secure browsing context. It also helps in handling authentication schemes (such as Security Assertion Markup Language (SAML) or work flows) where the user can reset password using the created history length. For providing protection from tampering, the signed token used to ensure protection against document tampering by storing the signed token of the reason for which an authentication request was initiated.

The proposed invention provides authentication to applications running on the local machine (Windows app or a Mac-OS desktop app). The invention ensures that no sensitive data is leaked to the unsecure context or any malicious scripts running in unsecure context. The invention helps to tackle multiple browser inconsistencies by passing the authsession token in the URL of the iFrame that makes the iFrame unique and non-cachable. The proposed invention can also work on all modern browsers that support the latest HTML5 standards and browser inconsistencies such as BFCACHE busting, IE protected zones, and Safari Intelligent Tracking Protection. Therefore, this invention provides a design/implementation for securely authenticating the user while maintaining the simplest possible user experience.

The proposed solution history trick is used to redirect the user back to file:///context once the user authenticates in the https:// context. When the user is taken to the authentication page of a tenant hosted at https:// url, the page sets a historyLen parameter in sessionStorage. Later depending on the auth scheme that is configured for that particular user, the user might be redirected any number of times and taken to any number of web applications for proving his identity. But once the authentication process succeeds, the user is taken back to the history location represented by 'historyLen−1'. This trick is important because without this authentication schemes such as SAML or workflows where the user resets his password becomes difficult to handle. The history trick also helps to support flows where the user drags and drops the file into browser or uses the File menu to open a file in browser. It also works seamlessly when the file is in a secure but third party context like inside share point or other file hosting services.

In the proposed solution, an authentication flow can be invoked for either initial authentication or for policy implementation. A file owner can enforce authentication on every document open. To ensure any tampering against this, a signed token of the reason for which an authentication request was initiated for is stored in the server.

Because of browser incompatibilities, it is efficient to do redirection from the insecure context rather than from the embedded iFrame. Also, to support multiple authentications flows simultaneously; it is imperative to know which auth session was completed successfully. The system can be used to make sure that the data sent to the insecure browsing context doesn't have any information which can aid in retrieving any sensitive information from the server. The solution proposed by the invention is to have a token & secret pair associated with the auth session. The token is sent to the insecure authentication context and also to the auth window so that the server can associate the auth context against the secret. After redirection using the history trick, the embedded secure context polls the server with the auth session secret to fetch sensitive information.

Passing the authSession token to unsecure browsing context helps in performing multiple auth simultaneously against the same tenant. This allows for flows when a user opens two files with different policies simultaneously. The association with authSession token helps to keep the flow consistent.

The present invention further provides solution to tackle multiple browser inconsistencies. For example: Firefox has a bfcache that by default caches the entire page's javascript. The system bust this cache by adding a pageshow listener. The IE's security zone and firefox's ITP is taken care by persisting the data in both localStorage and sessionStorage. Some browsers also cache iFrame's javascript and page state if the iFrame was loaded within a short period of time. The system passes the authsession token in the url of the iframe. This makes the iframe unique and non cachable.

Figure 10:
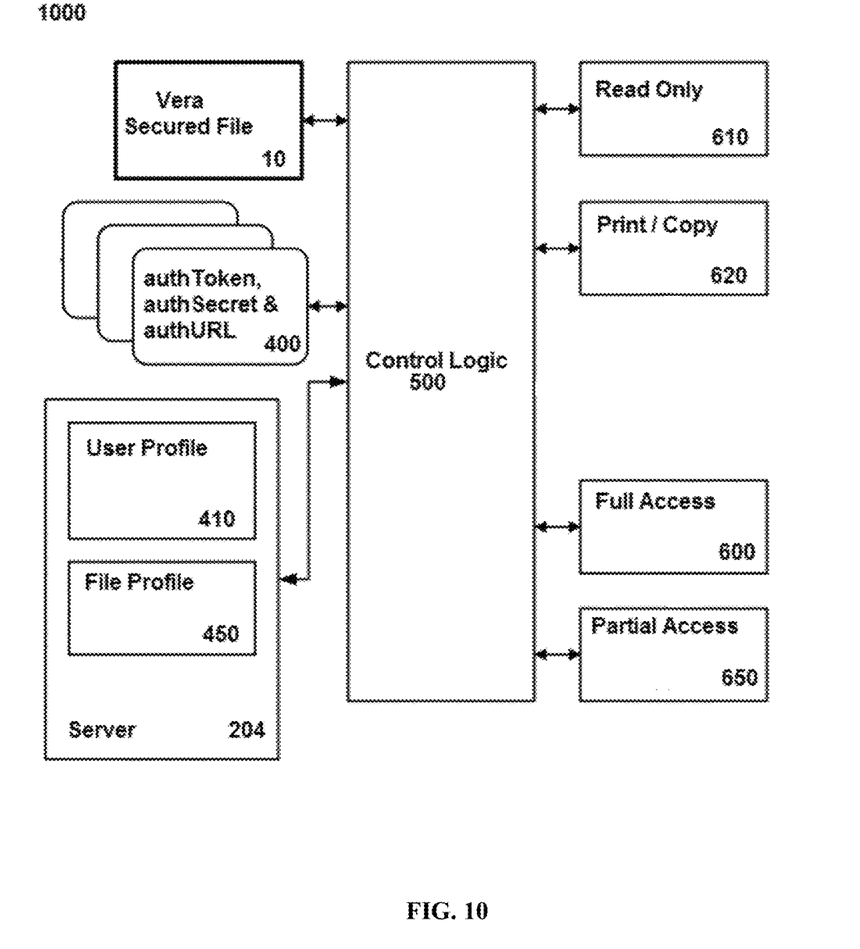
FIG. 10 illustrates a logic diagram of given system that includes various inputs and outputs which are part of the processing procedures in accordance with the present invention.

FIG. 10 illustrates a logic diagram 1000 that includes various inputs and outputs which are part of the processing procedures according to example embodiments. Referring to FIG. 10, the input parameters may include the secured file 10, the policy requests for the data i.e. authToken, authSecret & authURL 400. The input parameters also include user profile 410 and file profile 450 which are stored in the server 204. The control logic 500 may then utilize those inputs to view/open the secured file in a browser with certain output policies. These output policies are certain types of limitations which limits the ability for a user to view the data. For example, including but not limited to read only 610, print/copy 620, full access 600 and partial access or limited access 650.

The three possible attacks/security issues generally occur in a browser based systems are: no secure sessions, token Hijacking and privilege escalation. To solve these attacks/security issues the system utilizes one or more functions. In one implementation, the system passed the data (auth tokens) to the server as part of the /api/auth/session/sessionId is encrypted using standard secure sessions. In other implementation, the system prompt for confirmation from the user before calling the /api/auth/session/sessionID api while using a browser. In another implementation, the system let a user access to a document. The system scans for basic auth for logging and compare with the policy of document. If the document policy parameter does not match with user access parameters, then before redirecting the user to auth window for 'Auth on open', a variable called 'reason' is set in the web storage with value 'DOC_ACCESS'. Given this, a user can spoof the value in the storage and bypass 'Auth on open' check all together.

The invention ensures that no sensitive data is leaked to the unsecure context or any malicious scripts running in unsecure context. Further, the invention helps to tackle multiple browser inconsistencies by passing the AUTHsession token in the URL of the iFrame that makes the iFrame unique and non-cacheable.

Therefore, this invention provides a design/implementation for securely authenticating the user from file protocol while handling third party cookies and browser inconsistencies. In other words, this invention provides a way to authenticate user for viewing a secured file in a browser while maintaining the simplest possible user experience.

What is claimed is:

1. A method for authenticating a user for viewing a secured file in a browser, the method comprising:
    selecting a secured file in a server to access via a browser on a user device;
    reading a file wrapper which appears in a user interface associated with the user device as an original file type and which comprises metadata and data as a different file type;
    generating an inline frame in the browser informing the server to create an authorization session;
    generating an authorization session by the server with the browser on the user device; storing the authorization session data and history path in the browser;
    verifying user data access rights associated with the user device using an authorization key;
    opening the secured file in the browser on the successful validation of authorization key using stored history path in the browser.

2. The method of claim 1, wherein the history path uses history trick functions for redirecting the user back to the file after successful authentication.

3. The method of claim 1, wherein the method further comprises validating user using combination of authorization session tokens and secret from server to support multiple sessions.

4. The method of claim 1 further comprising: using multiple use cases where multiple files can be opened simultaneously with different authorization requirements.

5. The method of claim 1 wherein the method uses history path to redirect the user back to insecure browsing context once the user authenticates in the secure browsing context.

6. The method of claim 1 wherein the history path is used to help in handling authentication schemes such as Security Assertion Markup Language or work flows where the user can reset password using the created history length.

7. The method of claim 1 wherein the method provides protection from tampering of secured file by using a signed token to ensure protection against document tampering by storing the said signed token of the reason for which an authentication request was initiated.

8. The method of claim 1 wherein the method tackles multiple browser inconsistencies by passing the authorization session token in URL of the inline frame that makes the inline frame unique and non cacheable.

9. A system for authenticating a user for viewing a secured file in a browser, the system comprising:
    a processor configured to:
        select a secured file in a server to access via a browser on a user device;
        read a file wrapper which appears in a user interface associated with the user device as an original file type and which comprises metadata and data as a different file type;
        generate an inline frame in the browser informing the server to create an authorization session; and
        generate an authorization session by the server with the browser on the user device; and
    a memory to store the authorization session data and history path in the browser; wherein the processor is configured to verify user data access rights associated with the user device using an authorization key and to open the secured file in the browser on the successful validation of authorization key using stored history path in the browser.

10. The system of claim 9, wherein the history path uses history trick functions for redirecting the user back to the file after successful authentication.

11. The system of claim 9, wherein the system further validates a user using combination of authorization session tokens and secret from server to support multiple sessions.

12. The system of claim 9, wherein the system uses multiple use cases where multiple files can be opened simultaneously with different authorization requirements.

13. The system of claim 9, wherein the system uses history path to redirect the user back to insecure browsing context once the user authenticates in the secure browsing context.

14. The system of claim 9, wherein the history path is used to help in handling authentication schemes such as Security Assertion Markup Language or work flows where the user can reset password using the created history length.

15. The system of claim 9, wherein the system provides protection from tampering of secured file by using a signed token to ensure protection against document tampering by storing the said signed token of the reason for which an authentication request was initiated.

16. The system of claim 9, wherein the system tackles multiple browser inconsistencies by passing the authorization session token in URL of the inline frame that makes the inline frame unique and non cacheable.

* * * * *